United States Patent
Mayer et al.

(10) Patent No.: US 10,386,469 B2
(45) Date of Patent: Aug. 20, 2019

(54) METHOD FOR ASCERTAINING A USEFUL WIDTH OF A STREET SEGMENT

(71) Applicant: Robert Bosch GmbH, Stuttgart (DE)

(72) Inventors: Philipp Mayer, Stuttgart (DE); Peter Christian Abeling, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 554 days.

(21) Appl. No.: 15/195,430

(22) Filed: Jun. 28, 2016

(65) Prior Publication Data

US 2017/0003387 A1 Jan. 5, 2017

(30) Foreign Application Priority Data

Jul. 1, 2015 (DE) .................. 10 2015 212 296

(51) Int. Cl.
| G08G 1/14 | (2006.01) |
| G08G 1/16 | (2006.01) |
| G01S 13/08 | (2006.01) |
| G01S 13/93 | (2006.01) |
| G01S 15/08 | (2006.01) |
| G01S 15/93 | (2006.01) |

(52) U.S. Cl.
CPC .......... *G01S 13/08* (2013.01); *G01S 13/931* (2013.01); *G01S 15/08* (2013.01); *G01S 15/931* (2013.01); *G08G 1/147* (2013.01); *G08G 1/165* (2013.01)

(58) Field of Classification Search
None
See application file for complete search history.

(56) References Cited

U.S. PATENT DOCUMENTS

| 8,560,169 | B2 | 10/2013 | Sasajima et al. | |
| 9,601,018 | B2* | 3/2017 | Cogill | G08G 1/143 |
| 2010/0274446 | A1* | 10/2010 | Sasajima | G08G 1/14 |
| | | | | 701/36 |
| 2013/0057686 | A1* | 3/2013 | Genc | B60R 1/00 |
| | | | | 348/148 |
| 2013/0103301 | A1* | 4/2013 | Becker | G01S 13/867 |
| | | | | 701/409 |
| 2014/0097971 | A1* | 4/2014 | Barth | G01S 7/52004 |
| | | | | 340/932.2 |

(Continued)

FOREIGN PATENT DOCUMENTS

| DE | 101 49 206 A1 | 2/2003 |
| DE | 102004062021 A1 | 7/2006 |

(Continued)

*Primary Examiner* — Timothy A Brainard
*Assistant Examiner* — Donald HB Braswell
(74) *Attorney, Agent, or Firm* — Norton Rose Fulbright US LLP; Gerard Messina

(57) ABSTRACT

A method for ascertaining a useful width of a segment of a street, including traveling the street in a first direction of travel and ascertaining of parking spaces on the basis of echo profiles of an ascertaining device situated in an ascertaining vehicle; ascertaining of lateral distances between the ascertaining device and parked vehicles at both sides of the street, at least one ascertaining of parking spaces and lateral distances being carried out to the right of the ascertaining vehicle, and at least one ascertaining of the parking spaces and lateral distances being carried out to the left of the ascertaining vehicle; and ascertaining of the useful width from the ascertained lateral distances.

12 Claims, 2 Drawing Sheets

(56) References Cited

U.S. PATENT DOCUMENTS

| | | | | |
|---|---|---|---|---|
| 2015/0226565 | A1* | 8/2015 | Beaurepaire | G01C 21/34 |
| | | | | 701/533 |
| 2015/0371541 | A1* | 12/2015 | Korman | G08G 1/147 |
| | | | | 340/932.2 |
| 2016/0063861 | A1* | 3/2016 | Lee | G08G 1/14 |
| | | | | 340/932.2 |

FOREIGN PATENT DOCUMENTS

| | | |
|---|---|---|
| DE | 102008028550 A1 | 12/2009 |
| DE | 102009028024 A1 | 2/2011 |
| DE | 102009028644 A1 | 2/2011 |
| JP | 2009175962 A | 8/2009 |

\* cited by examiner

METHOD FOR ASCERTAINING A USEFUL WIDTH OF A STREET SEGMENT

CROSS REFERENCE

The present application claims the benefit under 35 U.S.C. § 119 of German Patent Application No. DE 102015212296.4 filed on Jul. 1, 2015, which is expressly incorporated herein by reference in its entirety.

FIELD

The present invention relates to a method for ascertaining a useful width of a street segment. The present invention also relates to a device for ascertaining a useful width of a street segment.

BACKGROUND INFORMATION

Conventional methods for detecting parking spaces include the use of distance-based sensors (e.g., ultrasound, radar, laser, video, lidar sensors). Conventional driver assistance systems for semi-automated parking in such detected parking spaces are available.

A transmission of parking space data to a server is described, for example, in German Patent Application Nos. DE 10 2004 062 021 A1, DE 10 2009 028 024 A1, and DE 10 2008 028 550 A1.

SUMMARY

An object of the present invention is to provide a method for ascertaining a useful width of a street segment.

According to a first aspect, the object may be achieved, for example, by a method for ascertaining a useful width of a segment of a street, having the steps:
  traveling the street in a first direction of travel and ascertaining of parking spaces on the basis of echo profiles of an ascertaining device situated in an ascertaining vehicle;
  ascertaining of lateral distances between the ascertaining device and parked vehicles at both sides of the street, at least one ascertaining of parking spaces and lateral distances being carried out to the right of the ascertaining vehicle, and at least one ascertaining of the parking spaces and lateral distances being carried out to the left of the ascertaining vehicle; and
  ascertaining of the useful width from the ascertained lateral distances.

According to a second aspect, the object may be achieved, for example, by a device for ascertaining a useful width of at least one segment of a street, having: an ascertaining vehicle having an ascertaining device, parking spaces between parked vehicles being ascertainable by the ascertaining device, lateral distances between the ascertaining device and the vehicles parked at the sides of the street being ascertainable by the ascertaining device, the useful width being ascertainable from the ascertained lateral distances.

Advantageously, in this way a parking space ascertaining device can be used to ascertain a useful width of a street segment. With the ascertained useful width, a specific route plan that avoids narrow streets can advantageously be proposed to a driver. In addition, free parking areas can be ascertained and can be provided to the driver in the form of a parking space map. Advantageously, a resolution of the named useful width ascertaining can be set as desired so that useful widths can be ascertained on a respective street segment having a defined length.

An advantageous development of the method in accordance with the present invention provides that for the case in which parking spaces are ascertained only to the right of the ascertaining vehicle and a quotient of the number of travel passes and the number of ascertained parking spaces exceeds a defined threshold, the useful width is ascertained from the following equation: useful width>range of the ascertaining device to the left of the ascertaining vehicle+ width of the ascertaining vehicle+mean value of the ascertained lateral distances to the right of the ascertaining vehicle. In this way, in cases in which parking space detections are present only in one lateral direction from the ascertaining vehicle, an approximate useful width of the street segment can be estimated. The named quotient can for example represent a noise threshold below which an ascertaining of the useful width is no longer carried out.

A further advantageous development of an example method of the present invention provides that in the case in which parking spaces has been ascertained at both sides of the ascertaining vehicle, and a quotient of travel passes and the number of ascertained parking spaces exceeds a defined threshold, the useful width is ascertained from the following equation: useful width=mean value of the ascertained lateral distances to the left of the ascertaining vehicle+width of the ascertaining vehicle+mean value of the ascertained lateral distances to the right of the ascertaining vehicle. In this way, the useful width can be ascertained precisely. In this case as well, the named quotient can define a defined threshold for noise below which no ascertaining of the useful width takes place.

An advantageous development of the method in accordance with the present invention provides that the useful width is ascertained by the ascertaining device. In this way, the useful width is ascertained already in the ascertaining vehicle, and can for example be provided to vehicle-internal assistance systems. This supports keeping data up-to-date to a high degree.

A further advantageous development of the method provides that ascertainment data are transmitted to a server device. In this way, the ascertaining of the useful width by the ascertaining vehicle can be stored on a server device, which as a rule has a greater computing capacity and a larger available data volume than the ascertaining vehicle.

An advantageous development of the method provides that the ascertainment data are automatically transmitted to the server device. In this way, over the long term a large quantity of "historical" data, highly up-to-date and precise, can be aggregated on the server device.

A further advantageous development of the method provides that the useful width is transmitted to the server device, or the lateral distances are transmitted to the server device and the useful width is ascertained by the server device. In this way, advantageously an item of data material can be processed individually, so that as a result an ascertaining of the useful width can be carried out with still greater precision.

A further advantageous development of the method provides that the useful width is ascertained from a defined number of travel passes of the segment of the street. In this way, the useful width can advantageously be ascertained as a function of the number of travel passes of the street segment; in this way, the precision of the ascertaining of the useful width increases as the number of travel passes increases.

A further advantageous development of the method provides that the travel passes of the segment of the street are carried out in different directions of travel, the ascertainment data of the travel passes in the different directions of travel being correlated. In this way, the ascertaining of the useful width based on the travel passes of the street segment in opposite directions can advantageously be carried out with still greater precision.

A further advantageous development of the method provides that the useful width is ascertained over a defined length of the segment of the street. In this way, selective values for the useful width can be provided, and in this way for example abrupt street narrowings or widenings can advantageously be taken into account.

In the following, the present invention, with further features and advantages, is described in detail on the basis of two Figures. Here, all disclosed features form the subject matter of the present invention, independent of their representation in the description and in the Figures. The Figures are in particular intended to illustrate the main principles of the present invention.

DETAILED DESCRIPTION OF EXAMPLE EMBODIMENTS

The so-called "useful width" or "drivable driving width" or "drivable lane" or "real street width" of a street is generally defined by the physical width of the street from curb edge to curb edge minus a width of a vehicle respectively parked at each side of the street. For a driver of a vehicle, this useful width is an important parameter when moving on a street, due inter alia to the fact that motor vehicles and drivers' driving capabilities vary, so that an ability and/or an intention to travel streets can differ in individual cases. Often, a small useful width is a motive for a driver not to travel on a street, because driving and/or parking maneuvers are possible there only under difficult circumstances.

Figure 1:
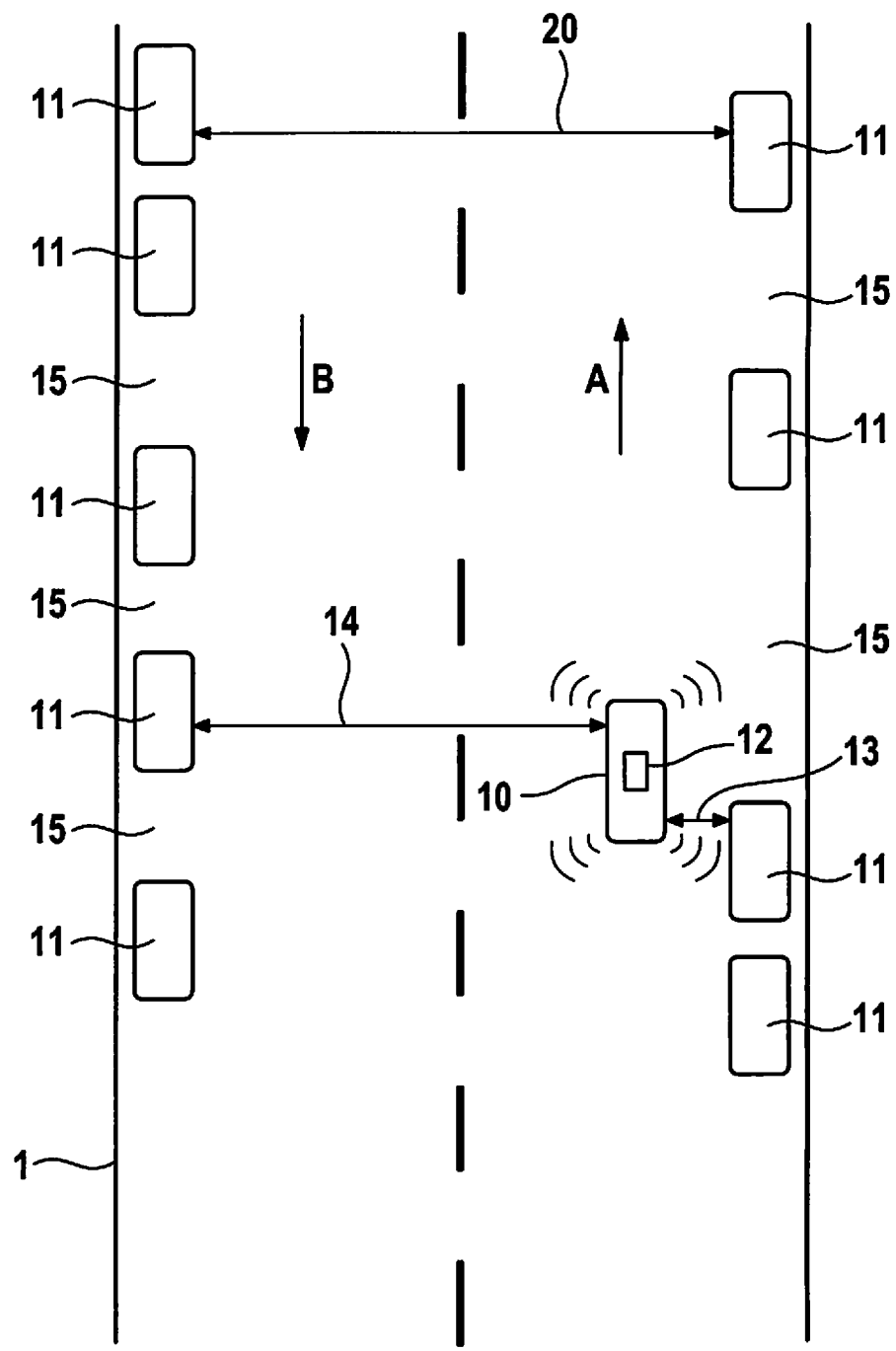
FIG. 1 shows a sketch explaining a functional principle of the method according to the present invention.

FIG. 1 illustrates a functional aspect of an example method in accordance with the present invention for ascertaining a useful width of the street segment. Visible is an ascertaining vehicle 10 traveling on a street 1, with traffic traveling on the right, in direction of travel A. On street 1, parked vehicles 11 are visible at both sides of the street, and parking spaces 15, e.g., in the form of open areas, entrances to parcels of land, home driveway entrances, etc., are present between the parked vehicles. Ascertaining vehicle 10 has an ascertaining device 12 for acquiring parking spaces 15, ascertaining device 12 having an ultrasound sensor, a radar sensor, or some other sensor suitable for ascertaining a distance to an object.

It is provided during driving to detect parking spaces 15 and, in the course of the detection of parking spaces 15, to ascertain lateral distances 13, 14 to parked vehicles 11. During the traveling of a defined segment of street 1, in this way as many lateral distances 13 as possible are acquired between ascertaining vehicle 10 and parked vehicles 11, at least one measurement being carried out in both lateral directions, generally at a right angle to the left and to the right of ascertaining vehicle 10. From ascertained lateral distances 13, 14, useful width 20 of street 1 is ascertained as follows, two different constellations being possible:

For the case in which no detections of parking spaces 15 or of lateral distances 14 to parked vehicle 11 were made to the left of ascertaining vehicle 10, useful width 20 can be ascertained or estimated according to the following equation (1):

$$\text{Useful width} > \text{sensor range to the left} + \text{mean value of the lateral right distances to parked vehicles} \quad (1)$$

For the case in which detections of parking spaces 15, or of lateral distances 14 (to the left) and lateral distances (to the right) have been carried out both to the left and to the right of ascertaining vehicle 10, useful width 20 can be ascertained precisely according to the following equation (2):

$$\text{Useful width} = \text{mean distance of the lateral left distances to parked vehicles} + \text{vehicle width} + \text{mean value of the lateral right distances to parked vehicles} \quad (2)$$

For both these cases, it is taken into account that a quotient of a number of travel passes of the street segment to be evaluated and detections of parking spaces 15 or lateral distances 13, 14 has to exceed a previously determined defined threshold in order to count as "genuine" parking space detection. For example, a value of the named threshold can be on an order of magnitude of approximately 0.1, preferably approximately 0.05, still more preferably approximately 0.01. If the quotient is below the defined value, it is assumed that this is signal noise and not genuine parking space detection, so that, resulting therefrom, no ascertaining of a useful width 20 is carried out.

Depending on the sensor technology used in ascertaining device 12, a different sensor range of ascertaining device 12 can be realized, whereby different useful widths 20 can be ascertained as a function of the technology used. An order of magnitude for an ascertainable useful width 20 is, in the case of ultrasound, approximately 10 m to approximately 15 m; an order of magnitude of an ascertainable useful width 20 is, in the case of radar, approximately 20 m to approximately 30 m. In the case in which street 1 becomes continuously narrower in the direction of travel, a left-side detection becomes more and more probable, because in this way the probability increases that ascertaining device 12 will radiate far enough to generate reflections at the left side of ascertaining vehicle 10.

The precision and the reliability of the ascertaining of the useful width 20 increases with the number of travel passes through the respective street segment, because the determination of the mean value is then carried out with a higher number of measurement values.

Advantageously, the ascertaining of useful width 20 can be carried out already in ascertaining vehicle 10 itself, for example using ascertaining device 12 or a control device provided for this purpose. Alternatively or in addition, it is also conceivable that all the acquired data are transmitted to a server device by a radio-based communication device (not shown) (e.g., based on GSM, EDGE, UMTS, LTE, WLAN, etc.) of ascertaining vehicle 10, the ascertaining of useful width 20 being carried out in this case by the server device, which generally is significantly more powerful.

In a further alternative, it can also be provided that only all measured individual values ("raw data") of lateral distances 13, 14 are transmitted to the server device. In this case, no data concerning parking spaces 15 are transmitted to the server device.

In this way, via the parking space detections a kind of pre-filtering is carried out that is used to ascertain useful width 20 of the street segment. Advantageously, the method can be implemented in existing parking space ascertaining devices.

As a result, in this way a useful width 20 can be communicated to a user of the vehicle, for example in the form of a representation on a navigation device. In addition, in this way an aggregation of data to form a parking space map can be carried out, from which it can be seen which regions of streets 1 are at all suitable as parking areas and can be used for parking. In this way, for example specific parking space maps can also be created having probabilities of the availability of open parking spaces at defined times of day.

Preferably, it is provided to ascertain useful width 20 via a freely definable, arbitrarily long segment of street 1. In this way, it is possible to ascertain street segments having greatly differing useful widths 20 (for example based on construction sites, traffic detours, etc.), and to prepare them correspondingly in terms of data. A resolution of the segment in which useful width 20 of street 1 is ascertained is straightforwardly possible in this way.

Preferably, it can also be provided that the described detections are also carried out in a second direction of travel B of street 1, and are correlated or compensated with the measurement values of the traveling of street 1 in travel direction A. In this way, the data quality of lateral distances 13, 14, or the precision of useful width 20 ascertained therefrom, can be still further improved.

Advantageously, with the described method for ascertaining useful width 20, a highly precise localization of the home vehicle, for example using a GPS position acquisition device, is not required.

Advantageously, the present invention can be realized using different technologies, e.g., ultrasound or radar, and in this way cost aspects can also be taken into account.

Preferably, the method can also be implemented as software, supporting easy adaptability or ability to update the method.

Figure 2:
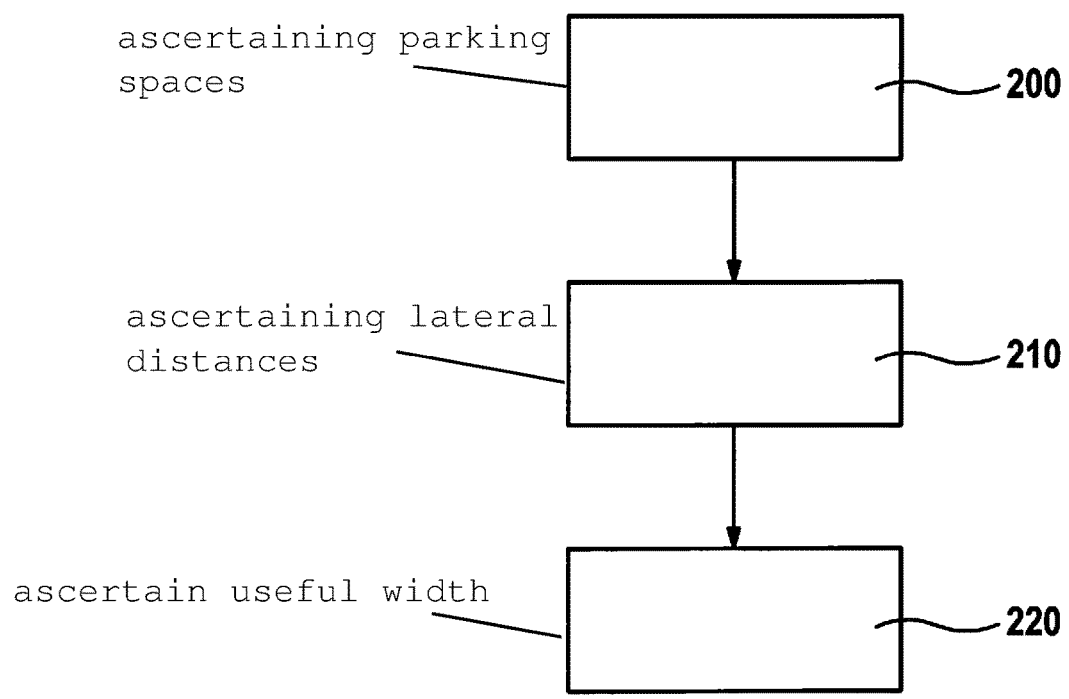
FIG. 2 shows a schematic flow of a specific embodiment of the method according to the present invention.

FIG. 2 shows a schematic flow diagram of a specific embodiment of the method according to the present invention.

In a step 200, street 1 is traveled in a first direction of travel A, and an ascertaining is carried out of parking spaces 15 on the basis of echo profiles of an ascertaining device 12 situated in an ascertaining vehicle 10.

In a step 210, an ascertaining of lateral distances 13, 14 between ascertaining device 12 and parked vehicles 11 at both sides of the street is carried out, at least one ascertaining of parking spaces 15 and lateral distances 13 being carried out to the right of ascertaining vehicle 10, and at least one ascertaining of parking spaces 15 and lateral distances 14 being carried out to the left of ascertaining vehicle 10.

In a step 220, the useful width 20 is ascertained from the ascertained lateral distances 13, 14.

In sum, the present invention proposes a method and a device for ascertaining a useful width of a street. A parking space detection device is functionalized in such a way that it provides further information in the form of a drivable lane or a useful width of a street segment. As a result, a kind of "data mining" of parking space detections is carried out, making use of the fact that in the case of wide streets left-side detections have a different character than right-side detections. This corresponds to the facts in the case of right-side traffic; in the case of left-side traffic the facts are precisely reversed.

Although the present invention has been described in the preceding on the basis of concrete examples of use, a person skilled in the art will also be able to realize specific embodiments not disclosed, or only partly disclosed, without departing from the core of the present invention.

What is claimed is:

1. A method for ascertaining a useful width of a segment of a street, the method comprising:
   traveling the street in a first direction of travel and ascertaining parking spaces on the basis of echo profiles of an ascertaining device situated in an ascertaining vehicle;
   ascertaining lateral distances between the ascertaining device and parked vehicles at both sides of the street, at least one ascertaining of parking spaces and lateral distances being carried out to the right of the ascertaining vehicle, and at least one ascertaining of the parking spaces and lateral distances being carried out to the left of the ascertaining vehicle; and
   ascertaining the useful width from the ascertained lateral distances;
   wherein travel passes of the segment of the street are carried out in different directions of travel, ascertainment data of the travel passes in the different directions of travel being correlated.

2. The method as recited in claim 1, wherein for the case in which parking spaces have been ascertained only to the right of the ascertaining vehicle and a quotient of a number of travel passes and a number of ascertained parking spaces exceeds a defined threshold, the useful width is ascertained from the following equation: useful width is greater than a range of the ascertaining device to the left of the ascertaining vehicle plus a width of the ascertaining vehicle plus a mean value of the ascertained lateral distances to the right of the ascertaining vehicle.

3. The method as recited in claim 1, wherein for the case in which parking spaces have been ascertained at both sides of the ascertaining vehicle and a quotient of a number of travel passes and a number of ascertained parking spaces exceeds a defined threshold, the useful width is ascertained from the following equation: useful width equals a mean value of the ascertained lateral distances to the left of the ascertaining vehicle plus a width of the ascertaining vehicle plus a mean value of the ascertained lateral distances to the right of the ascertaining vehicle.

4. The method as recited in claim 1, wherein the useful width is ascertained by the ascertaining device.

5. The method as recited in claim 4, wherein ascertainment data from the ascertaining device is transmitted to a server device.

6. The method as recited in claim 5, wherein one of: i) the useful width is transmitted to the server device, and ii) the lateral distances are transmitted to the server device and the useful width being ascertained by the server device.

7. The method as recited in claim 1, wherein the useful width is ascertained from a defined number of travel passes of the segment of the street.

8. The method as recited in claim 1, wherein the useful width is ascertained over a defined length of the segment of the street.

9. A device for ascertaining a useful width of at least one segment of a street, comprising:
   an ascertaining vehicle having an ascertaining device, parking spaces between parked vehicles being ascertainable by the ascertaining device, lateral distances between the ascertaining device and the vehicles parked at the sides of the street being ascertainable by the ascertaining device, the useful width being ascertainable from the ascertained lateral distances;

wherein travel passes of the segment of the street are carried out in different directions of travel, ascertainment data of the travel passes in the different directions of travel being correlated.

10. The device as recited in claim 9, wherein the ascertaining vehicle has a radio-based communication device for transmitting ascertainment data of the ascertaining device to a server device.

11. The device as recited in claim 9, wherein the ascertaining device includes one of an ultrasound sensor or a radar sensor.

12. A non-transitory computer-readable storage medium storing a computer program, which is executable by a processor, comprising:

a program code arrangement having program code for ascertaining a useful width of a segment of a street, by performing the following:

ascertaining, as an ascertaining vehicle is traveling the street in a first direction, parking spaces on the basis of echo profiles of an ascertaining device situated in the ascertaining vehicle;

ascertaining lateral distances between the ascertaining device and parked vehicles at both sides of the street, at least one ascertaining of parking spaces and lateral distances being carried out to the right of the ascertaining vehicle, and at least one ascertaining of the parking spaces and lateral distances being carried out to the left of the ascertaining vehicle; and ascertaining the useful width from the ascertained lateral distances;

wherein travel passes of the segment of the street are carried out in different directions of travel, ascertainment data of the travel passes in the different directions of travel being correlated.

\* \* \* \* \*